US010826994B1

(12) United States Patent
Frigo et al.

(10) Patent No.: US 10,826,994 B1
(45) Date of Patent: *Nov. 3, 2020

(54) DEPLOYABLE SENSOR SYSTEM USING MESH NETWORKING AND SATELLITE COMMUNICATION

(71) Applicant: Triad National Security, LLC, Los Alamos, NM (US)

(72) Inventors: Janette Frigo, Santa Fe, NM (US); Stephen Judd, Los Alamos, NM (US); Michael Proicou, Los Alamos, NM (US); Kevin McCabe, Santa Fe, NM (US); Donald Enemark, Los Alamos, NM (US); Alexandra Saari, Santa Barbara, CA (US); Shawn Hinzey, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,084

(22) Filed: Jun. 21, 2018

Related U.S. Application Data

(63) Continuation of application No. 15/259,121, filed on Sep. 8, 2016, now Pat. No. 10,015,259, which is a
(Continued)

(51) Int. Cl.
*H04L 29/08* (2006.01)
*G01D 9/32* (2006.01)
(Continued)

(52) U.S. Cl.
CPC ............ *H04L 67/12* (2013.01); *G01D 9/32* (2013.01); *H04B 7/15507* (2013.01); *H04W 52/0258* (2013.01); *H04W 84/18* (2013.01)

(58) Field of Classification Search
CPC ..... H04W 84/00–22; H04W 84/18–22; H04W 52/0258; H04W 4/38;
(Continued)

(56) References Cited

U.S. PATENT DOCUMENTS 6,735,630 B1 * 5/2004 Gelvin ................ B60R 25/1004
706/33
8,275,313 B1 9/2012 Myers et al.
(Continued)

FOREIGN PATENT DOCUMENTS

WO 2008145676 A2 12/2008

OTHER PUBLICATIONS

"XBee for Arduino and Raspberry Pi," Cooking Hacks, https://www.cooking-hacks.com/documentation/tutorials/xbee-arduino-raspberry-pi-tutorial/ (last accessed Apr. 26, 2016).
(Continued)

*Primary Examiner* — Raymond S Dean
(74) *Attorney, Agent, or Firm* — LeonardPatel P.C.; Michael Aristo Leonard II; Sheetal Suresh Patel

(57) ABSTRACT

A sensor system may be configured for continuous operation in a low resource environment and/or in extreme environmental conditions. The sensor system may have sufficient processing capabilities to provide scientific computing for pre-processing, quality control, statistical analysis, event classification, data compression and corrections (e.g., spikes in the data), autonomous decisions and actions, triggering other nodes, and information assurance functions that provide data confidentiality, data integrity, authentication, and non-repudiation. The hardware may have both mesh networking and satellite and cellular communication capability, and may be available for relatively low cost. Such a network provides the flexibility to have potentially any number of
(Continued)

nodes be completely independent from one another. Thus, the network may scale across a diverse terrain.

20 Claims, 6 Drawing Sheets

Related U.S. Application Data continuation of application No. 15/138,672, filed on Apr. 26, 2016, now abandoned.

(60) Provisional application No. 62/153,295, filed on Apr. 27, 2015.

(51) Int. Cl.
*H04B 7/155* (2006.01)
*H04W 52/02* (2009.01)
*H04W 84/18* (2009.01)

(58) Field of Classification Search
CPC ... H04B 7/14–17; H04B 7/2606; H04L 67/12; H04L 67/28; G01D 21/00
See application file for complete search history.

(56) References Cited

U.S. PATENT DOCUMENTS

| | | | |
|---|---|---|---|
| 10,015,259 B1* | 7/2018 | Frigo | H04W 52/0258 |
| 2002/0060267 A1 | 5/2002 | Yavnai | |
| 2002/0131362 A1* | 9/2002 | Callon | G06F 11/2294 370/216 |
| 2003/0218540 A1 | 11/2003 | Cooper et al. | |
| 2005/0094576 A1* | 5/2005 | Fonseca, Jr. | H04L 45/42 370/255 |
| 2006/0168205 A1* | 7/2006 | Barron | H04L 41/12 709/224 |
| 2007/0040673 A1 | 2/2007 | Bohine | |
| 2007/0041333 A1 | 2/2007 | Twitchell | |
| 2007/0127503 A1* | 6/2007 | Zhao | H04L 45/18 370/400 |
| 2008/0057863 A1 | 3/2008 | Jalali | |
| 2008/0268855 A1* | 10/2008 | Hanuni | H04W 72/0406 455/445 |
| 2008/0287144 A1 | 11/2008 | Sabata et al. | |
| 2008/0291006 A1 | 11/2008 | Kang et al. | |
| 2012/0036198 A1* | 2/2012 | Marzencki | H04L 61/6081 709/206 |
| 2012/0117268 A1* | 5/2012 | Shaffer | H04L 45/24 709/238 |
| 2012/0188934 A1* | 7/2012 | Liu | H04L 12/1863 370/312 |
| 2012/0256762 A1 | 10/2012 | Greenberger | |
| 2012/0311016 A1* | 12/2012 | DeAnna | H04L 41/046 709/202 |
| 2013/0294261 A1 | 11/2013 | Ghosh et al. | |
| 2014/0252099 A1 | 9/2014 | Hatton et al. | |
| 2015/0003309 A1 | 1/2015 | Mukherjee | |
| 2015/0103707 A1* | 4/2015 | Panta | H04W 52/0203 370/311 |
| 2015/0139198 A1 | 5/2015 | Hwang et al. | |
| 2016/0029384 A1* | 1/2016 | Sidhu | H04W 72/0453 370/329 |
| 2016/0091614 A1 | 3/2016 | Akers et al. | |
| 2016/0361222 A1 | 12/2016 | Publicover et al. | |
| 2017/0124885 A1 | 5/2017 | Patterson et al. | |

OTHER PUBLICATIONS

Actel Igloo Product Page, http://www.actel.com/FPGA/handheld/?p=sn (last accessed Apr. 26, 2016).
Alexandra Saari et al., "Small Burst Data (SBD) Satellite Communications," LA-UR-14-26452, http://permalink.lanl.gov/object/tr?what=info:lanl-repo/lareport/LA-UR-14-26452, issued Aug. 14, 2014 (last accessed Dec. 10, 2015).
Brennan et al., "Radioactive Source Detection by Sensor Networks," IEEE Transactions on Nuclear Science, vol. 52, No. 3, pp. 813-819 (Jun. 2005).
David B. Johnson, David A. Maltz, and Josh Broch, "DSR: The Dynamic Source Routing Protocol for Multi-Hop Wireless Ad Hoc Networks," Mobile Computing (1996).
Digi XBEE-PRO 900HP RF MODEMS White Sheet, http://www.mouser.com/ds/2/111/ds_xbeepro_900hp_rtmodem-372442.pdf (last accessed Apr. 26, 2016).
Frigo et al., "Energy Efficient Sensor Node Implementations," ACM/SIGDA International Symposium on Field Programmable Gate Arrays (FPGA) 2010, Monterey, California, http://www.edwardrosten.com/work/frigo_2010_efficient.pdf (Feb. 21-23, 2010).
Frigo et al., "Exploring Reconfigurable Hardware Architectures for Distributed Sensor Network Systems," SenSys 2008, Raleigh, NC (Nov. 5-7, 2008).
Frigo et al., "Radiation Detection and Situation Management by Distributed Sensor Networks," SPIE Proceedings on Defense, Security and Sensing (2009).
Frigo et al., "Sensor Network Based Vehicle Classification and License Plate Identification System," IEEE INSS (2009).
Ganguly et al., "Knowledge Discovery from Sensor Data for Security Applications," chap 13, pp. 205-229 (2007).
Gu et al., "Lightweight Detection and Classification for Wireless Sensor Networks in Realistic Environments," SenSys 05, San Diego, California (Nov. 2005).
Igloo Overview Page, http://www.microsemi.com/products/fpga-soc/fpga/igloo-overview (last accessed Apr. 26, 2016).
LPC ARM9 Page, http://www.nxp.com/products/microcontrollers-and-processors/arm-processors/lpc-arm7-arm9-mcus/lpc-arm9-microcontrollers:MC_1423301659316?cof=0&am=0 (last accessed Apr. 26, 2016).
Mouser Electronics XBee Purchase Page, http://www.mouser.com/Search/Refine.aspx?Keyword=xbee (last accessed Apr. 26, 2016).
Nemzek et al., "Distributed Sensor Networks for Detection of Mobile Radioactive Sources," IEEE Transactions on Nuclear Science, vol. 51, No. 4, pp. 1693-1700 (Aug. 16, 2004).
Non-Final Office Action received in U.S. Appl. No. 15/259,121 dated Nov. 11, 2017.
Parunak et al., "Swarming Pattern Detection in Sensor and Robot Networks," ANS 10th Conference on Robotics and Remote Systems for Hazardous Environments, Gainsville, FL (2004).
Quinlan, "Induction of Decision Trees," Machine Learning 1, pp. 81-106 (1986).
Raymond S. Dean, "Advisory Action", dated Feb. 15, 2018, U.S. Appl. No. 15/259,121.
Raymond S. Dean, "Non-Final Office Action", dated Mar. 29, 2018, U.S. Appl. No. 15/868,517.
Raymond S. Dean, "Notice of Allowance", dated Apr. 20, 2018, U.S. Appl. No. 15/259,121.
Saari et al., "Using SDI-12 with ST Microelectronics MCU's," http://permalink.lanl.gov/object/tr?what=info:lanl-repo/lareport/LA-UR-15-26961 (Sep. 3, 2015).
Saint Gobain Web Page, http://www.crystals.saint-gobain.com/ (last accessed Apr. 26, 2016).
Saito, et al., Journal of Environmental Radioactivity, vol. 139, Jan. 2015.
Stephens et al., "Detection of Moving Radioactive Sources Using Sensor Networks," IEEE Transactions on Nuclear Science, vol. 51, No. 5, pp. 2273-2278 (Oct. 2004).
Viola et al., "Rapid Object Detection using a Boosted Cascade of Simple Features," Conference on Computer Vision and Pattern Recognition (2001).
Michael L. Brown et al., "QUIC: A Fast, High-Resolution 3D Building-Aware Urban Transport and Dispersion Modeling System", 2014, Air & Waste Management Association.
Raymond S Dean, "Final Office Action", dated Jul. 18, 2018, U.S. Appl. No. 15/868,517.
Raymond S Dean, "Notice of Allowance", dated Mar. 5, 2019, U.S. Appl. No. 15/868,517.

(56) References Cited

OTHER PUBLICATIONS

Raymond S Dean, "Non-Final Office Action", dated Oct. 19, 2018, U.S. Appl. No. 15/868,517.
Raymond S. Dean, "Advisory Action", dated Sep. 26, 2018, U.S. Appl. No. 15/868,517.

* cited by examiner

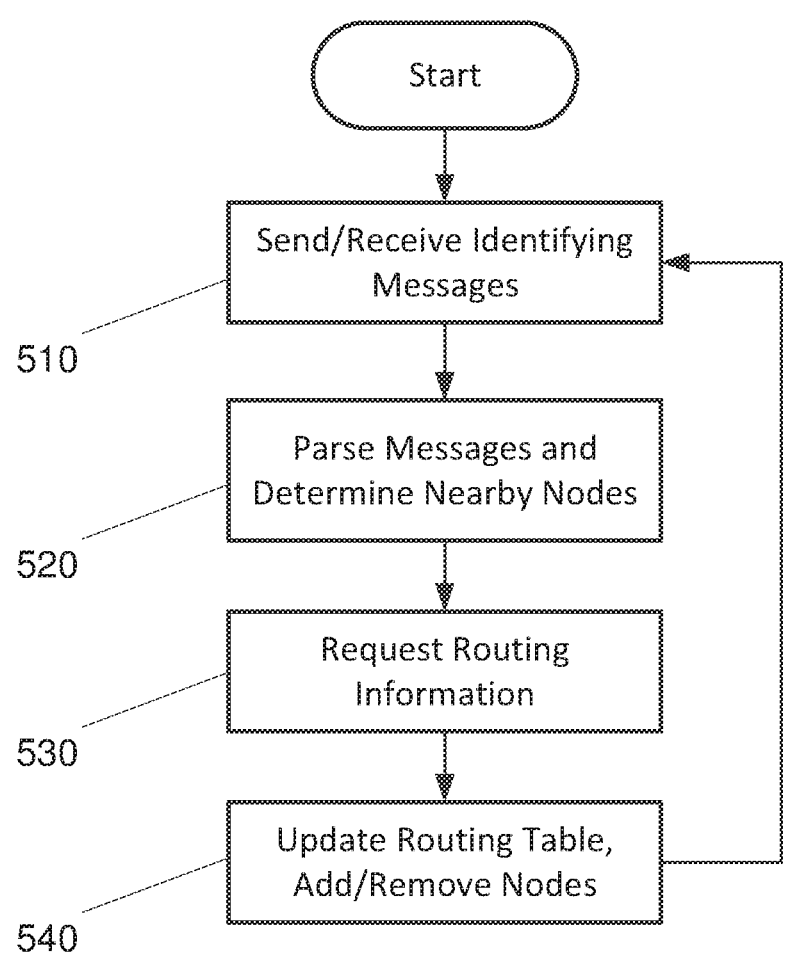

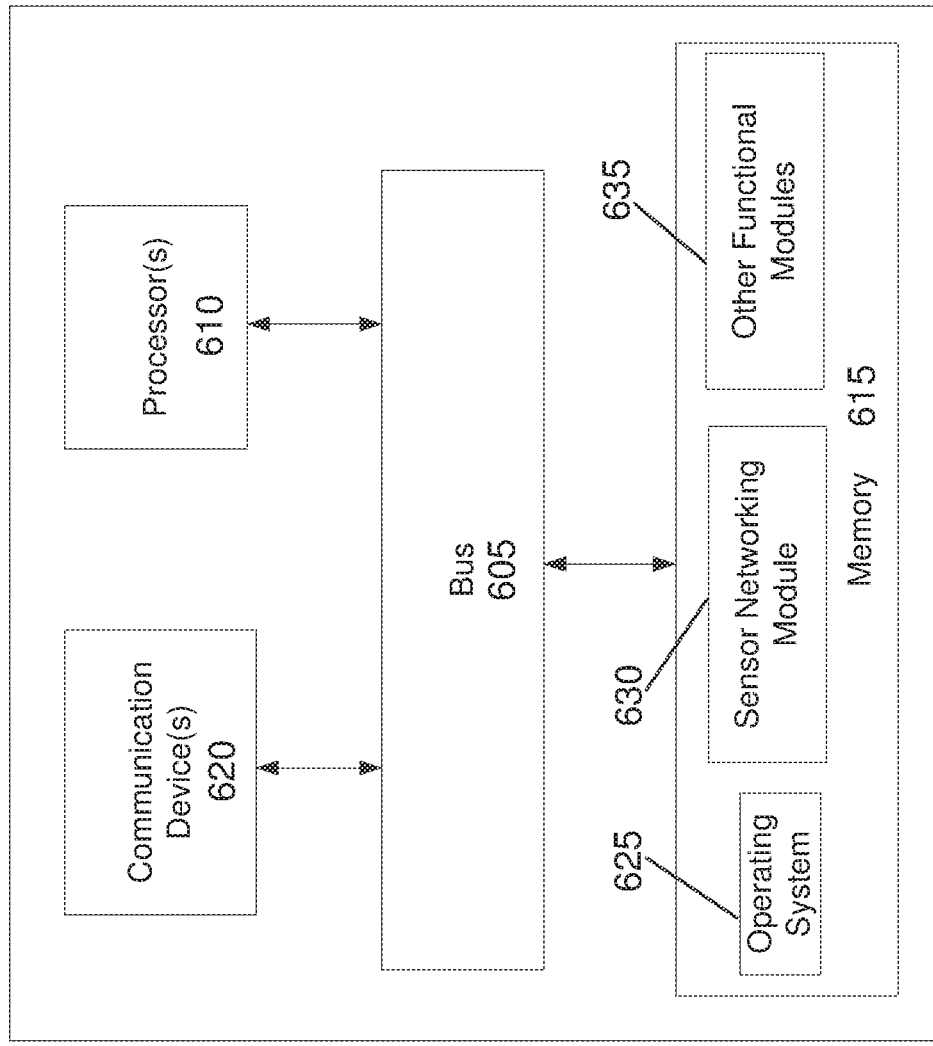

DEPLOYABLE SENSOR SYSTEM USING MESH NETWORKING AND SATELLITE COMMUNICATION

CROSS REFERENCE TO RELATED APPLICATION

This application is a continuation of U.S. Nonprovisional patent application Ser. No. 15/259,121 filed Sep. 8, 2016, which is a continuation of U.S. Nonprovisional patent application Ser. No. 15/138,672 filed Apr. 26, 2016, which claims the benefit of U.S. Provisional Patent Application No. 62/153,295 filed Apr. 27, 2015. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to sensor systems, and more particularly, to deployable, scalable sensor systems that use mesh networking and satellite communication.

BACKGROUND

Conventional commercial deployable sensor network hardware does not have the computational capability or the communications capability to function as a relatively large hardware network in a remote location. However, certain sensing applications would benefit from such capabilities. For example, environmental monitoring systems have field locations that are often in extreme, remote environments. No power is readily available, yet the science experiments generally require sensors and equipment to run constantly for periods of one to five years.

As such, conventional sensors are connected in a wired array and data is stored to a local hard drive. Data retrieval is often manual, requiring a field campaign lasting a few days. Furthermore, once at the site, damage may have occurred and valuable data may have been lost due to weather, animals, or other factors. Wired arrays are also not readily scalable in number of nodes or distance between nodes. Manual data retrieval makes data management and distribution difficult. Accordingly, an improved sensor system may be beneficial.

SUMMARY

Certain embodiments of the present invention may provide solutions to the problems and needs in the art that have not yet been fully identified, appreciated, or solved by conventional sensor system technologies. For example, some embodiments of the present invention pertain to an ultra-low power sensor system that is capable of being deployed in harsh environments and is configured for mesh networking either directly to an internet portal or to a cellular or satellite modem for communication to a central server. Wireless nodes connected via a self-forming, self-healing network address scalability issues with conventional approaches. Timely data collection and world-wide communication with a central data server enables data management capabilities that would otherwise be impractical in some embodiments.

In an embodiment, a networking system may include a plurality of nodes. Each of the plurality of nodes may include a line-of-sight (LOS) radio configured to communicate with nodes within range of a signal transmitted by the LOS radio. One or more nodes of the plurality of nodes may be connected to a sensor. Such a node is defined herein as a "sensor" node. At least one of the plurality of nodes may include communication hardware configured to communicate with a satellite, a cellular network, a radio network, or any combination thereof. Such a node is defined herein as a "receiver" node. Receiver nodes may also be connected to a sensor. Nodes may lack hardware connection to the sensor, but be configured to transmit data between a plurality of nodes. Such a node is defined herein as a "relay" node. One or more relay nodes may exist in the LOS network.

In another embodiment, a mesh networking sensor system may include a plurality of nodes. Each of the plurality of nodes may include a LOS radio configured to communicate with nodes within range of a signal transmitted by the LOS radio. The plurality of nodes may be configured to form a self-forming, self-healing mesh network. The mesh networking sensor system may include at least one sensor in communication with one or more sensor or relay nodes of the plurality of nodes to a receiver node.

In yet another embodiment, a system may include a plurality of nodes. Each of the plurality of nodes may include a LOS radio configured to communicate with nodes within range of a signal transmitted by the LOS radio. The plurality of nodes may be configured to form a self-forming, self-healing mesh network. At least one of the plurality of nodes may include communication hardware configured to communicate with a satellite or cellular modem. Two-way communication via modem to a central server enables remote data retrieval from, and control of, the system.

In an embodiment, a networking system includes a plurality of nodes. Each of the plurality of nodes includes a LOS radio configured to communicate with nodes within range of a signal transmitted by the LOS radio. At least one of the plurality of nodes includes communication hardware configured to communicate with a satellite, a cellular network, a radio network, or any combination thereof. Nodes that lack the satellite, cellular, and/or radio communication hardware, if any, are configured to transmit data to at least one of the plurality of nodes comprising the satellite, cellular, and/or radio communication hardware directly, via one or more relay nodes, or both.

In another embodiment, a mesh networking sensor system includes a plurality of nodes. Each of the plurality of nodes includes a LOS radio configured to communicate with nodes within range of a signal transmitted by the LOS radio. The mesh networking sensor system also includes at least one sensor in communication with one or more sensor nodes of the plurality of nodes. The plurality of nodes is configured to form a self-forming, self-healing mesh network. At least one of the plurality of nodes includes communication hardware configured to communicate with a satellite, a cellular network, a radio network, or any combination thereof. Nodes that lack the satellite, cellular, and/or radio communication hardware, if any, are configured to transmit data to at least one of the plurality of nodes including the satellite, cellular, and/or radio communication hardware directly, via one or more relay nodes, or both. The one or more sensor nodes are configured to receive data from the at least one sensor and relay or directly communicate the received data to the satellite, the cellular network, and/or the radio network.

In yet another embodiment, a system includes a plurality of nodes. Each of the plurality of nodes includes a LOS radio configured to communicate with nodes within range of a signal transmitted by the LOS radio. The plurality of nodes is configured to form a self-forming, self-healing mesh network. At least one of the plurality of nodes includes communication hardware configured to communicate with a satellite. Nodes that lack the satellite communication hardware, if any, are configured to transmit data to at least one of the plurality of nodes comprising the satellite communication hardware directly, via one or more relay nodes, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is a flowchart illustrating a process for self-forming a mesh network, according to an embodiment of the present invention.

FIG. 6 is a block diagram of a sensor system hardware board, according to an embodiment of the present invention.

DETAILED DESCRIPTION OF THE EMBODIMENTS

Figure 1:
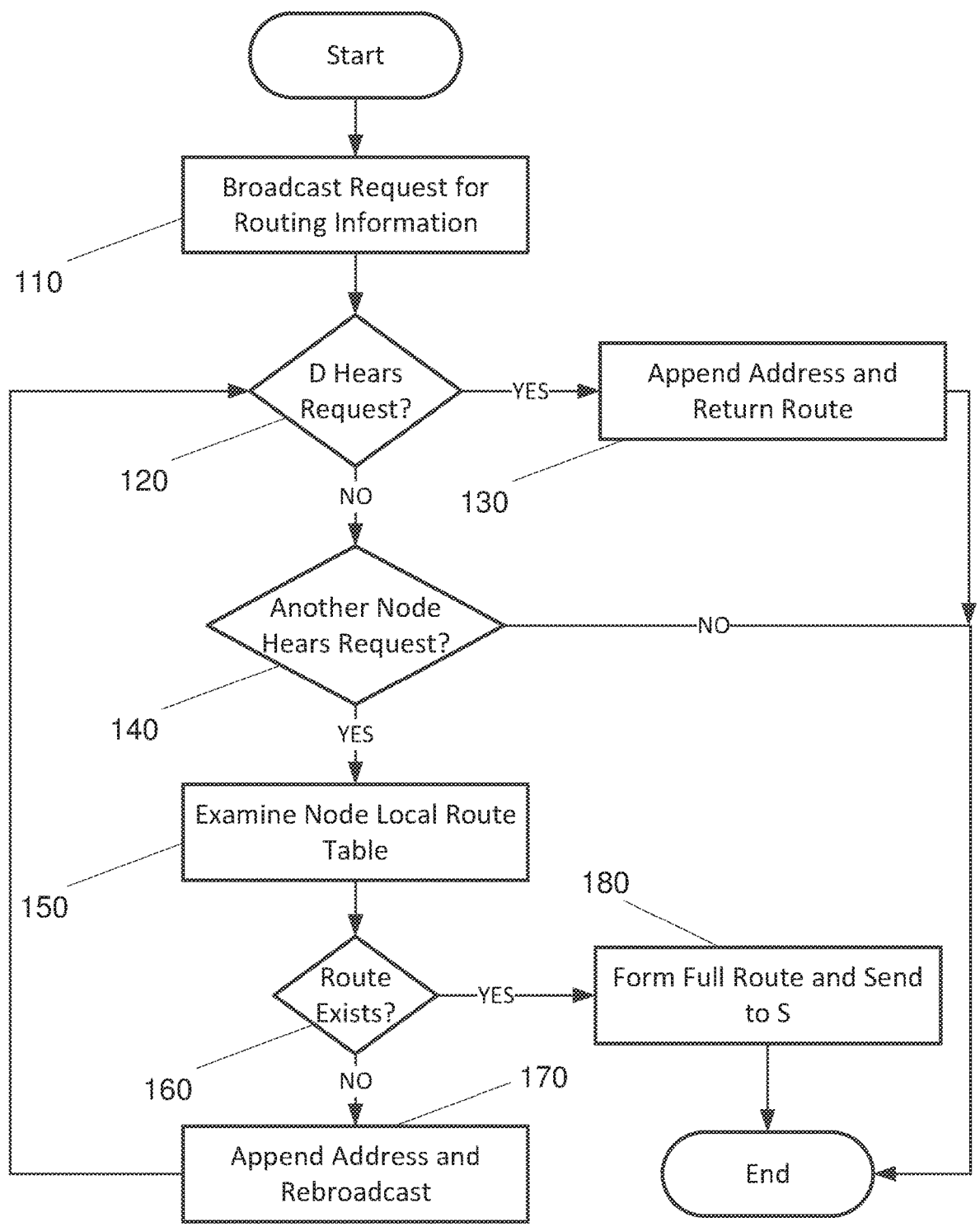
FIG. 1 is a flowchart illustrating a process for a self-forming mesh network of sensor nodes, according to an embodiment of the present invention.

Some embodiments of the present invention pertain to sensor systems that are designed for 24/7 operation in a low resource environment, i.e., low power consumption and/or extreme environmental conditions. Such embodiments may have sufficient processing capabilities at the sensor node to provide scientific computational complexity suitable for compression, classification, data analysis, autonomous decisions, and triggering of itself and other sensor nodes in the network. The sensor system hardware may have both mesh networking and two-way satellite communication capability, and may be available for relatively low cost. Certain embodiments may also be scalable across diverse and/or unknown terrain, and may be capable of operating in difficult terrain in which conventional systems cannot, e.g., ridges and valleys, mountains, etc.

In some embodiments, the sensor system may operate in the single watt or microwatt range and be designed for operation in environments of 85° C. to −40° C. Some embodiments may be scalable across unknown terrain, available for relatively low cost, and enable satellite data transmission in near-real time (i.e., within seconds after transmission, the data is received by the satellite) from anywhere on Earth. Some embodiments may communicate time between nodes to enable synchronous data collection of a plurality of nodes and/or accurate time stamp of data collection to a common time reference. Such embodiments may have advantageous features that separate them from conventional sensor systems including, but not limited to: (1) the sensor system may enable scientific computing for pre-processing, quality control, statistical analysis, event classification, data compression and corrections (e.g., spikes in the data), autonomous decisions and actions, triggering other nodes, and information assurance functions that provide data confidentiality, data integrity, authentication, and non-repudiation of raw data prior to data transmission in a C-based programming environment—this computational feature is not currently commercially available in the marketplace for remote environmental monitoring systems; (2) standard data ports may be included for connection directly to environmental sensors and data loggers; (3) dual functionality for data transmission via satellite or cellular modem may be provided; and/or (4) a low power line-of-sight (LOS) radio may be possible.

The sensor system of some embodiments may use a custom self-healing, self-forming mesh networking algorithm that enables easy installation and robust performance in the field. A network node can operate in three roles simultaneously in some embodiments: (1) as an originator; (2) as a destination; and (3) as a relay. In some embodiments, 20 nodes or 100 nodes may be used. However, the network is scalable to any desired number of nodes without deviating from the scope of the invention.

As an originator, the node may generate traffic and inject it into the network. The traffic may be internally generated data (e.g., state-of-health (SOH) data of a node), data from externally attached sensors, commands, data from a remote server, etc. As a destination, a node may receive traffic from the network. The traffic may be processed locally or exported, via other hardware interfaces, to other computer systems. As a relay, the node may be called upon to relay messages from node A to node B. This generally indicates that node A and node B do not have a strong enough direct LOS radio contact with one another or a route that has too much traffic.

Some embodiments may use a store-and-forward datagram protocol. Network nodes in some embodiments may be identified by a unique numeric hardware address up to 256 bits (but not limited to the 256 bits addressable space) and network datagram messages may be sent. Any desired message length may be used without deviating from the scope of the invention. Each message may be encoded with extra information for forward error correction (FEC) for robustness in the case of radio interference. Message headers may contain a list of network nodes that will relay the message. The message route may contain up to 6 entries in some embodiments, but any number of entries may be used as a matter of design choice without deviating from the scope of the invention. The originator of the message needs to learn the network in order to route it correctly.

Each network node operates by listening for messages. Received messages are decoded and buffered in internal memory. Upon receipt, the message header is examined to see if it has arrived at the correct node in the route. If not, the message may be discarded. If the receiving node is the correct node, the message is forwarded to the next node in the route. If the end of the route has been reached, the message has arrived at its intended recipient. Since each datagram message contains the full route, it is possible for a message to be routed via an intermediate node, e.g., node S to node X to node D, where a message originating at S is sent to D using X as a relay, even if intermediate node X has no routes to or from S or D.

Each network node may maintain a list of routes to other known nodes in the network in the form of a route table. Each route may represent a potential path between a message originator and an intended recipient. Multiple routes to a destination may be kept. This allows for quicker fallback in the event that a route goes bad. The routing table may be different on each node, and there may be no global source for knowledge of the network topology. Routing information may be created on demand when a message is sent to a new destination. This process, called "route discovery," allows the network to be self-forming.

Route discovery may be performed when a source node S needs to send a message to a destination node D. A network node can discover its neighbors simply by listening. If S can hear transmissions from D, for instance, then a route from S to D is presumed to exist. Route discovery is a recursive process that discovers all routes between S and D. The route discovery process may proceed until all routes between S and D have been discovered. Zero hop routes are discovered quickly (i.e., D can hear S directly). Routes with more hops are discovered as the candidate route in the route request message is filled in. This process terminates when the candidate route is full. As the network evolves, each node has a customized list of potential routes to destination(s) that it may use.

FIG. 1 is a flowchart 100 illustrating a process for a self-forming mesh network of sensor nodes, according to an embodiment of the present invention. The process begins with creating a route table by broadcasting a request for routing information from a source node S to a particular destination node D at 110. The request carries along a candidate route that will be filled in by other network nodes. If D hears this request at 120, it responds by appending its address to the candidate route and returning the route to S in the form of a route response message at 130. D may not have a pre-existing route to S, but by reversing the candidate route in the route request, D is guaranteed to be able to route a message back to S.

If any other node (e.g., node X) hears the request at 140, node X examines its local route table for a route to the destination node at 150. If a route to S exists at 160, the route from the route table is joined with the partial route in the incoming route request to make a full route from S to D via node X, and the message is then sent to S at 180, which will add the information to its route table. As before, X may reverse the candidate route in the route request to guarantee being able to route the message back to S. Otherwise, X will append its address to the candidate route in the route request message and re-broadcast the route request message at 170. The process then returns to step 120.

Figure 2:
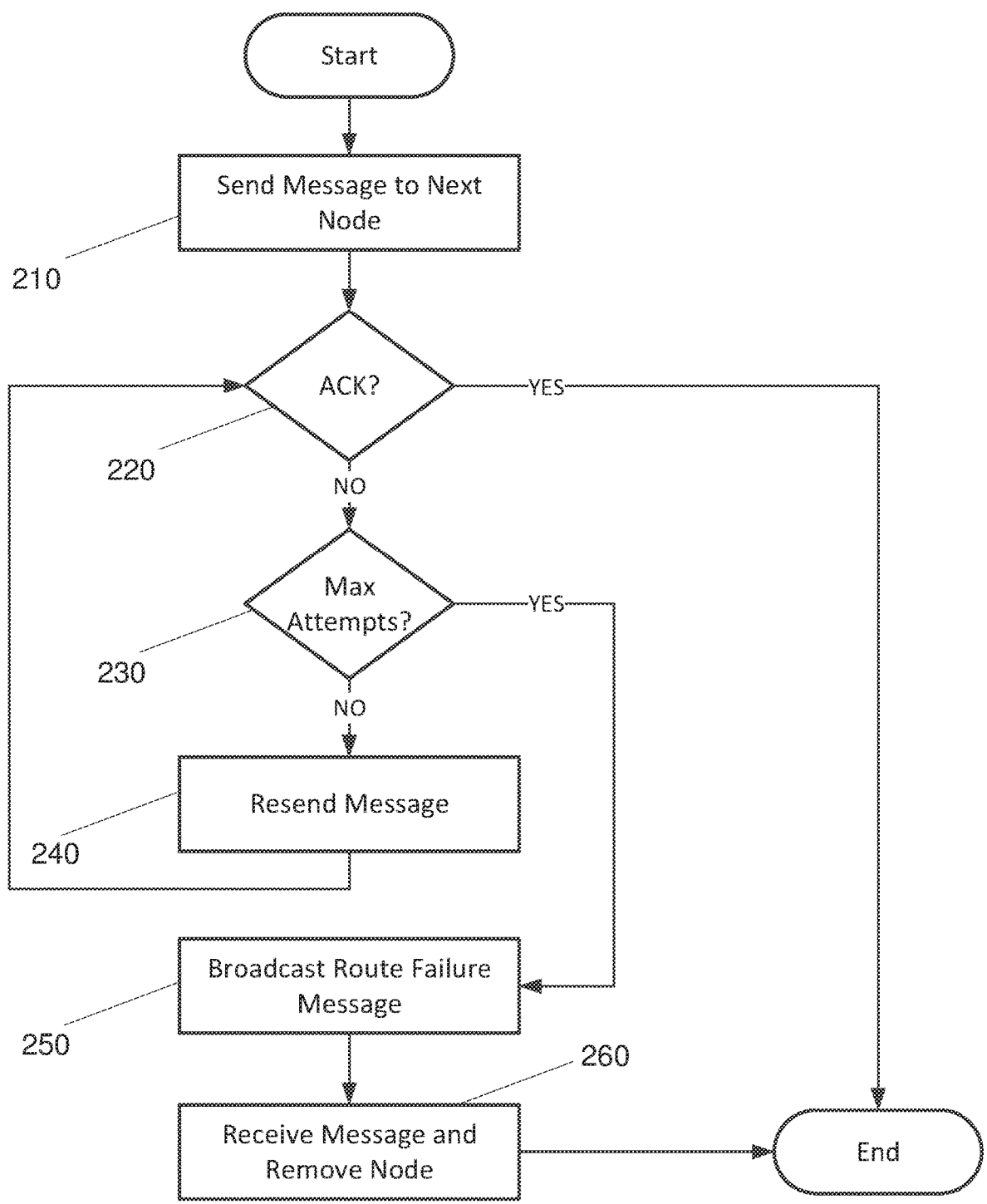
FIG. 2 is a flowchart illustrating a process for a self-healing mesh network of sensor nodes, according to an embodiment of the present invention.

FIG. 2 is a flowchart 200 illustrating a process for a self-healing mesh network of sensor nodes, according to an embodiment of the present invention. Each datagram message relay "hop" requires an explicit acknowledgement (ACK) from the next node in the route in this embodiment. The process begins with sending a message to the next node at 210. If an ACK response is received at 220, the process ends.

However, if the ACK response is not received at 220, a count of the number of attempted transmissions is incremented. If the count does not exceed a predetermined number of attempts at 230, the message is re-sent at 240, and the process returns to step 220. If a predetermined number of attempts to send the message is reached at 230 and no reply has been received within a predetermined amount of time, the transmission is abandoned (i.e., the message is discarded) and a route failure message is broadcast at 250. The failure message identifies the link that is no longer valid (e.g., from node X to node D).

Upon receipt of a route failure message, each recipient node examines the local route table for occurrences of the bad link, and any route containing that link is discarded at 260. Thus, the route failure message allows the network to notice failed or poor quality network links and eliminate them from the route tables of the network nodes.

New nodes may be added to the network at any time and begin participating in message routing and route discovery immediately in some embodiments. A new node may originate datagram traffic by generating route requests and discovering routes to various destinations. Joining the network may require the ability to respond to route request messages. The new node may then start appearing in route tables.

Mode of Operation of Sensor Network System

In some embodiments, data transmission within the sensor network system on the ground is implemented by a LOS radio. Data transmission to a remote server may be implemented with a commercial satellite modem, such as a Short Burst Data (SBD) modem. As discussed above, each sensor node may have multiple functions for data transmission in some embodiments. In other words, any sensor node in the network may be a communication "receiver" node for data transmission (i.e., a destination node), a relay node, and/or a sensor data collection node (i.e., an originating node). The receiver node collects data from several or all nodes in the network and organizes the data into packets for data transmission via a satellite or cellular link, or via a LOS transmission link. A relay node sends sensor data to another node in the network based on routing table information. A sensor node collects raw data and has the ability to process the raw data according to application requirements and transmit the data anywhere in the network, i.e., to another sensor node or a receiver node, or the sensor node may store the data in flash memory, for example, and transmit the data per application requirements.

Figure 3:
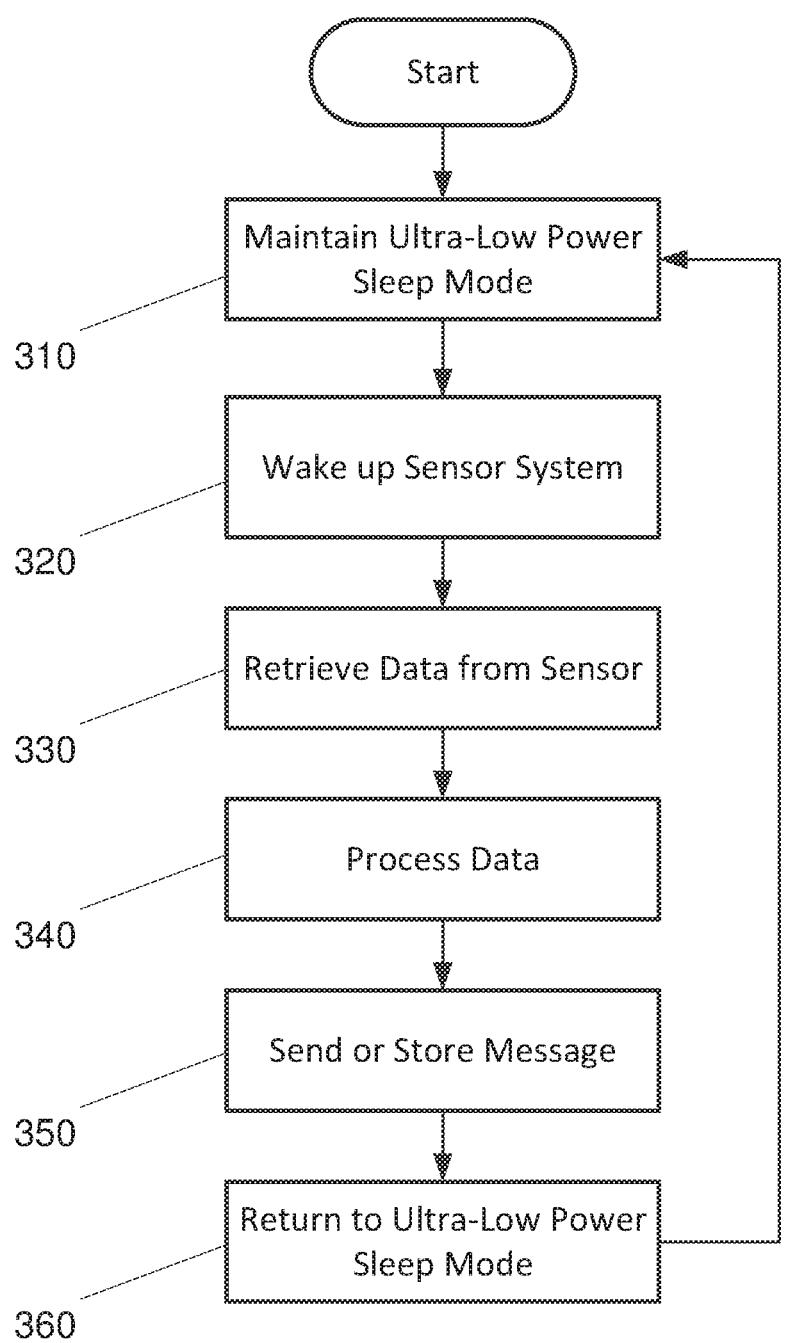
FIG. 3 is a flowchart illustrating a mode of operation of a sensor network system, according to an embodiment of the present invention.

FIG. 3 is a flowchart 300 illustrating a mode of operation of a sensor network system, according to an embodiment of the present invention. The process starts with the system being maintained in an ultra-low power sleep mode (e.g., in the microwatt range) at 310. The hardware components in some embodiments are specifically chosen for a low power, low resource environment. Industrial or military temperature specifications may be used for hardware components on the board. Also, the software may enable the low power modes of operation that are features of the microprocessor and the SBD modem used in some embodiments.

After a predetermined time has elapsed, the system wakes up at 320 (e.g., consuming 276 milliwatts of power for approximately two minutes in some embodiments) to retrieve data from the sensor at 330, process the data at 340, and store the data to flash memory, or send a message (e.g., 340 bytes) via satellite (e.g., 1.2 Watts for tens of milliseconds), cellular, or LOS radio at 350. The sensor system then returns to the ultra-low power sleep mode at 360, and the process returns to step 310. The data bandwidth, number of sensor nodes, relay nodes, and rate of transmission are application-specific in some embodiments.

Figure 4:
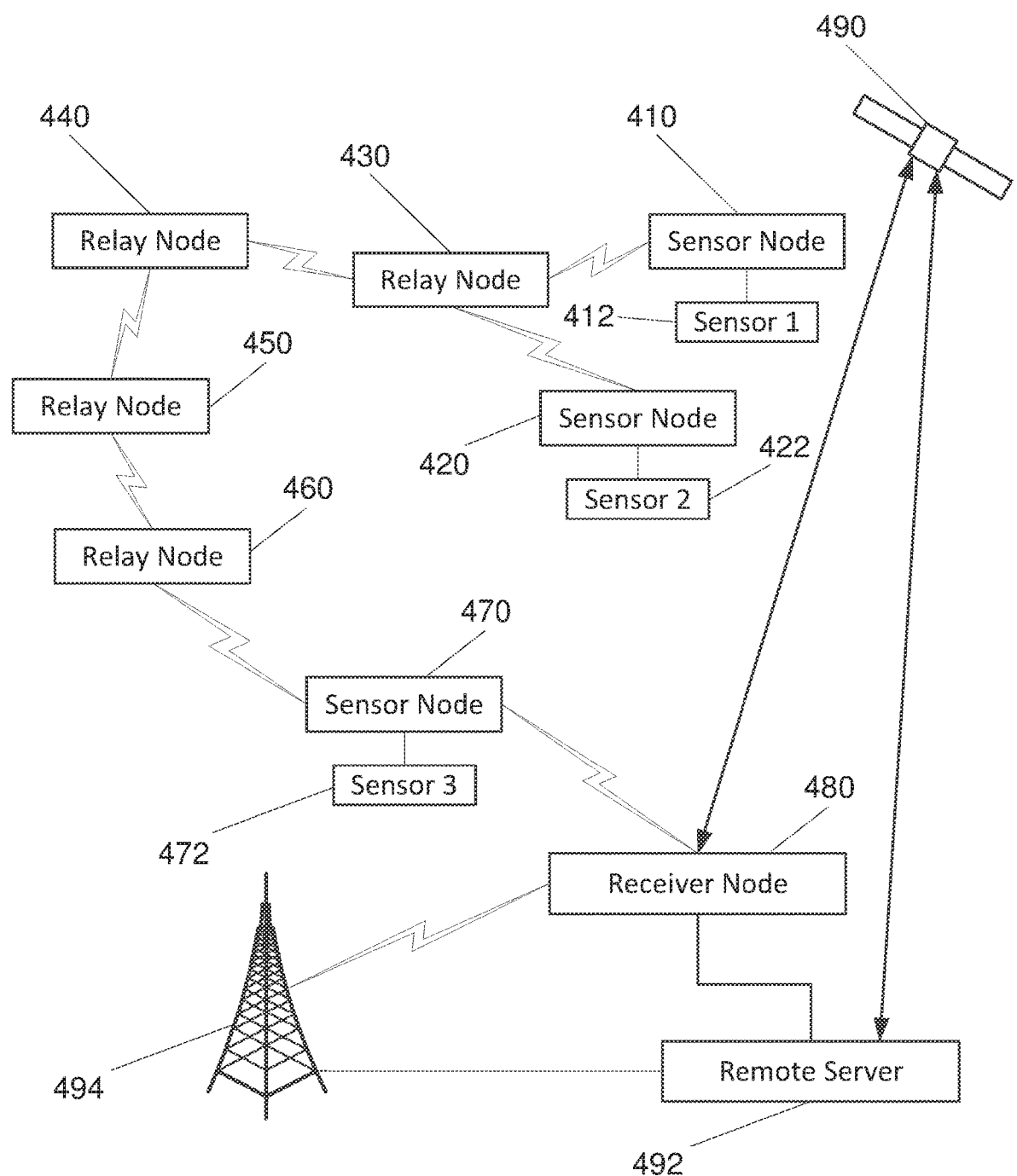
FIG. 4 is an architectural diagram illustrating a sensor system, according to an embodiment of the present invention.

A system architecture 400 of an embodiment is shown in FIG. 4. Sensor nodes 410, 420 have respective sensors 412, 422, and sensor node 470 has respective sensor 472. Relay nodes 430, 440, 450, 460, receiver node 480, and satellite 490 are also included. Data collected by sensor nodes 410, 420, as well as by sensor node 470, is transmitted via nodes 410, 420, 430, 440, 450, 460, and/or 470 to receiver node 480. Receiver node 480 is configured for two-way communication with satellite 490, and receiver node 480 transmits the collected data to satellite 490, which may then transmit the data to one or more desired ground stations (not shown).

A remote server 492 is configured for direct two-way communication with satellite 490 in this embodiment. However, in some embodiments, remote server 492 may only receive one-way communications from satellite 490. Furthermore, in certain embodiments, remote server may receive communications from satellite 490 remotely. These communications may include various information from the nodes and sensors, such as SOH information, scientific data collected by the sensors, etc. This information may then be accessed by various users. In this embodiment, remote server 492 is physically connected to receiver node 480 via Ethernet, for example. However, in other embodiments, any wireless communication media may be used for communication between remote server 492 and receiver node 480 without deviating from the scope of the invention.

A communication tower 494 is configured to receive wireless transmissions from receiver node 480. Communication tower 494 may be configured for cellular communication, radio communication, or both, in some embodiments. Remote server 492 is configured to receive communications from communication tower 494 as well. Thus, in this embodiment, remote server 492 may receive data from receiver node 480 via wireless transmission, satellite transmission, or both. The option of both communication modes means that data can be transmitted even when only one mode of communication is available (e.g., no satellites are in range). However, in certain embodiments, receiver node 480 is only configured for wireless communication with communication tower 494 or satellite communication with satellite 490 or is connected directly to remote server 492, as shown in FIG. 4.

In some embodiments, there are various separate modes of network communications. In some embodiments, all nodes (sensor, relay, and receiver nodes) are configured completely with LOS communication and the receiver node is connected to the users host server directly. In certain embodiments, all nodes are configured to use satellite communication, enabling the network to scale to any desired size and for each individual node to be completely independent of others and located anywhere with a view of the sky. This problem of scaling is the quintessential issue with conventional sensor networks, and the only limitation of some embodiments is the amount of data sent per message, e.g., commercial satellite SBD size of 340 bytes. Thus, a large amount of data will take some time and power to be transmitted, but it can be done so any desired message size can be sent. Some commercial satellite modems can handle larger message sizes, such as 19.2 k bits/second, and can be used with any of the plurality of nodes in this network. In this case, all the sensor data may be managed on the user's server.

In some embodiments, all sensor nodes are configured to use cellular communication, and all sensor nodes are also independent from one another. In certain embodiments, all nodes are configured with LOS and/or satellite communications, but relay nodes use LOS communication. A relay node could use satellite or cellular communication, if necessary, but LOS communication would take precedence due to a lower power profile with its use. In certain embodiments, all nodes are configured with LOS and/or cellular communications. Relay nodes would typically use LOS communication. In some embodiments, nodes are configured with LOS, cellular communications, satellite communications, or any combination thereof. The sensor and receiver nodes could use any one or all of these three modes of communications to transmit data to the LOS network, a satellite sensor node, or a cellular node.

Some embodiments provide a novel combination of low power, reasonable computational capability, long range (e.g., several kilometers), and an environmentally rugged design. Accordingly, such embodiments may be set up over very wide and remote areas (e.g., canyons, mountains, forests, etc.) using a relatively low number of nodes. Conventional systems do not provide this combination of features in a standalone system. Furthermore, no conventional system works at the kilometer range. This combination of features allows research scientists, for example, to setup the system in remote areas and simply walk away without having to return to collect sensor data. Furthermore, it allows scientists to spend more time analyzing data and less time in the field, and may significantly reduce costs associated with visiting remote locations.

Mode of Operation of Mesh Networking Line-of-Sight Communication Data Link

The design of some embodiments has a low power, LOS radio operating at 1 Watt in either the 900 MHz industrial, scientific and medical (ISM) band or the 414 MHz band for government applications. The entire network may operate on a single frequency of approximately 902 MHz or 414 MHz for data transmission between sensor nodes in the sensor network system. This data rate may be configurable between 3125 bits per second (bps) and up to 26041 bps. Lower data rates increase reliability in noisy RF environments, such as the relatively crowded 902 MHz band. Such a radio may be capable of operating at a range of several kilometers between nodes.

The mesh network of some embodiments may be implemented with a custom self-healing, self-forming mesh networking algorithm. Each node in the network may be able to generate messages, relay messages from other nodes, and/or receive messages, subject to RF link availability. The network may be self-forming in that each node learns about the nearby nodes that can be used to relay messages to the final destination. A node may request routing information from its neighbors in order to discover more distant nodes. The process of requesting routine information from neighbors may be repeated and over time, all of the potential routes may be discovered. A single node can appear only once in the route in some embodiments. This prevents the formation of loops in the routing table.

Such a process for a self-forming mesh network is illustrated in flowchart 500 of FIG. 5. The process for a given node begins with periodically sending messages containing identifying information to, and receiving such messages from, other nodes in the network that are within RF range at 510. The information contained in these messages may include, but is not limited to, source (i.e., originating) node address, destination node address, the explicit route (i.e., a list of R network nodes indicating the network path to use for this message), and/or a hop index (i.e., a value from 0 to R indicating the active hop in the route). The hop index may be used to identify the next hop that a message takes in transit. A node address of 255, for example, may be used to indicate a broadcast message. These messages may be acted upon by any node that receives them.

Next, the node parses received messages and determines nearby nodes in RF range at 520 that can be used to relay messages to a final destination. The node then requests routing information from its neighbors to discover more distant nodes at 530. New nodes are added to the routing table at 540. A message may be explicitly routed to its destination using one or more individual nodes as relays. Each message relay (i.e., a "hop") may be explicitly acknowledged to ensure that the message is delivered. If the acknowledgement is not received, the transmitting node may re-send the message. If the number of re-transmissions exceeds an application-dependent threshold, the network link may be marked as failed and removed from the routing information table at 540. The process may be repeated, returning to step 510, until all potential routes are discovered.

The network may be self-healing in that if an individual node fails, the absence of a message acknowledgment may be used to mark the radio link between the transmitting node and the received node as no longer valid. The route failure message may then be broadcast to the remainder of the network and each node that receives the route failure message may remove the bad link from its routing information table. In this way, the loss of network connectivity may be noticed by the remainder of the network. If the node is later repaired, the route discovery process may notice the reappearance of the node and add it to the route table.

Mode of Operation of Satellite Communication Data Link

The Iridium satellite constellation is a global array of 66 low Earth orbit (LEO) satellites that provide voice and data communication to any point on Earth. A suitable modem, such as the SBD modem discussed above, communicates with the Iridium satellite network and the mobile hardware in an embodiment. The modem sends data to, and receives data from, the network directly in the form of SBD packets in this embodiment. The modem may receive up to 270 bytes and transmit up to 340 bytes to the network per communication. Data to or from the satellite network may be received and processed by an Iridium "gateway" location. The data may then be processed by a reseller that distributes the information to the user through some type of prearranged network interface (e.g., an email attachment, text message, website, etc.). To send data to their modem, users should send their data to the reseller via a prearranged method, the reseller may pass the data to Iridium, Iridium may communicate with the satellite network, and the modem may receive the respective user's data.

The satellite communication link may be capable of two-way communication. As such, the satellite communication link may also be used for remote monitoring and debugging of individual nodes (e.g., if a SBD modem is attached to the node). SOH information on the system, e.g., station ID, battery voltages, microprocessor temperature, system temperatures, time/date stamp, an event status bit (e.g., "1" indicates that an event, such as a scientific goal, has occurred and "0" indicates that no event has occurred), etc. may be sent. Data collection rates may be changed, the data transmission schedule or frequency may be modified, the monitoring posture of the mode may be changed, sensors may be subtracted from or added to the data monitoring stream per application requirements, etc.

Processor Capabilities

Due to the remote nature of the deployed systems in some embodiments, power consumption should be minimized while retaining a high level of functionality. To address this constraint, the board may be administered through a Real Time Operating System (RTOS) running on an ARM microprocessor, for example, that may draw as little as 238 µA in some embodiments. The microprocessor may be programmed in the C programming language using a suitable programmer, such as Kiel's uVision 4 IDE™ and Kiel's uLink-ME™ programmer in some embodiments. The RTOS may be the RTX™ system from Kiel. Satellite communications may be implemented using an SBD modem as discussed above.

The ARM-based microprocessor may have the following features in some embodiments: an ARM 32-bit Math Coprocessing Unit and Floating Point Unit (MCU+FPU), 1 MB Flash internal ROM, 192+4 KB internal SRAM, 210 DMIPS, 3 Analog to Digital Converters (ADCs), and 15 communications interfaces (e.g., RS232 Serial, SDI (e.g., SDI-12), Ethernet, 9 General Purpose Input/Output (GPIO) ports, 2 UARTS (radio interfaces)). The sensor system hardware board may have on-board memory, as well as a configurable SDIO Socket for Flash Memory up to 16-32 gigabytes. Each board may be hardware addressable up to 256. To transmit and receive signals, a UART can be used in half-duplex mode going to a hardware solution that both inverts the signal and translates the 3.3 volt logic to 5 volts. Alternatively, the UART may be used in standard mode and a hardware solution may be employed that inverts the signal, shifts the output to 5 volt levels, and converts the single, bidirectional, data line to and from the two UART TX/RX lines.

FIG. 6 is a block diagram of a sensor system hardware board 600, according to an embodiment of the present invention. Board 600 includes a bus 605 or other communication mechanism for communicating information, and processor(s) 610 coupled to bus 605 for processing information. Processor(s) 610 may be any type of general or specific purpose processor, including a central processing unit ("CPU"), application specific integrated circuit ("ASIC"), or field programmable gate array ("FPGA"). Processor(s) 610 may also have multiple processing cores, and at least some of the cores may be configured to perform specific functions. Board 600 further includes a memory 615 for storing information and instructions to be executed by processor(s) 610. Memory 615 can be comprised of any combination of random access memory (RAM), read only memory (ROM), flash memory, cache, static storage such as a magnetic or optical disk, or any other types of non-transitory computer-readable media or combinations thereof. Additionally, board 600 includes one or more communication devices 620, such as a transceiver and antenna configured for satellite communication and/or local communication with other nodes to facilitate mesh networking and sensor operations and data collection.

Non-transitory computer-readable media may be any available media that can be accessed by processor(s) 610 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 615 stores software modules that provide functionality when executed by processor(s) 610. In certain embodiments, the software modules may be written in C. The modules include an operating system 625 for board 600. The modules further include a sensor networking module 630 that is configured to perform the various node operations discussed herein, such as collecting data from one or more sensors, communicating with other nodes and/or a satellite, facilitating mesh networking, updating routing tables, etc. Board 600 may include one or more additional functional modules 635 that include additional functionality.

It should be noted that some of the board features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 1-3 and 5 may be performed by a computer program, encoding instructions for the nonlinear adaptive processor to perform at least the processes described in FIGS. 1-3 and 5, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 1-3 and 5, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, and/or an FPGA.

In an embodiment, a computer-implemented method includes broadcasting a request for routing information, by a source node S, from node S to a destination node D. The request includes a candidate route that will be filled in by other network nodes. The computer-implemented method also includes receiving the request for routing information, by an intermediate node X and appending the address of node X to a candidate route, and broadcasting the candidate route. When node D receives the request, the computer-implemented method further includes appending the address of node D, by node D, to the candidate route and returning the route to node S in a route response message.

In another embodiment, a computer program is embodied on a non-transitory computer-readable medium. The program is configured to cause at least one processor to transmit a message to a next node. When an acknowledgement (ACK) is not received from the next node, the program is configured to cause the at least one processor to re-transmit the message for at most a predetermined number of attempts. When the predetermined number of attempts to re-transmit the message is reached, and no reply has been received within a predetermined amount of time, the program is further configured to cause the at least one processor to abandon the transmission and broadcast a route failure message.

In yet another embodiment, an apparatus includes memory storing computer program instructions and at least one processor with access to the memory. The at least one processor is configured to maintain the apparatus in an ultra-low power sleep mode until a predetermined amount of time has elapsed or until triggered by a sensor signal, a radio signal in a network, or a satellite modem signal. After the predetermined amount of time has elapsed, or when triggered by the signal from the sensor, the radio signal in the network, or the satellite modem signal, the at least one processor is configured to wake up the apparatus, retrieve data from a sensor, and process the retrieved sensor data. The at least one processor is also configured to transmit a message containing at least some of the processed data via a satellite modem, transmit the message via a LOS radio, store the message to memory, or any combination thereof. The at least one processor is further configured to return the apparatus to the ultra-low power sleep mode after the transmission.

In still another embodiment, a system includes a plurality of nodes that include a LOS radio. The plurality of nodes has sufficient processing capabilities to perform compression, classification, data analysis, autonomous decisions and actions, triggering other nodes, and information assurance functions to provide data confidentiality, data integrity, authentication, and non-repudiation. The plurality of nodes is also configured for mesh networking. The plurality of nodes is further configured to function as an originator, a destination, and a relay.

It will be readily understood that the components of various embodiments of the present invention as claimed, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A sensor node configured to perform scientific computing in a self-forming mesh network, comprising:
a line-of-sight (LOS) radio configured to transmit and receive communication signals;
a sensor configured to collect scientific data; and
a processor configured to perform scientific computing for pre-processing, quality control, statistical analysis, event classification, data compression and corrections, autonomous decisions and actions, triggering other nodes, and information assurance functions to provide data confidentiality, data integrity, authentication, and non-repudiation.

2. The sensor node of claim 1, wherein the sensor node is configured to form the self-forming mesh network with a plurality of other nodes by:
periodically sending messages comprising identifying information to, and receiving messages comprising identifying information from, the other nodes in the network that are within range of the LOS radio.

3. The sensor node of claim 2, wherein the messages comprise a source node address, a destination node address, an explicit route, and a hop index that identifies a next hop that the message takes in transit.

4. The sensor node of claim 3, wherein each hop is explicitly acknowledged to ensure that a given message is delivered.

5. The sensor node of claim 2, wherein a predetermined node address indicates a broadcast message that is acted upon by any node that receives the broadcast message.

6. The sensor node of claim 2, wherein the forming of the self-forming mesh network further comprises:
parsing a received message and determining nearby nodes in range of the LOS radio that can be used to relay messages to a final destination;
requesting routing information from neighbor nodes to discover more distant nodes; and
adding the discovered more distant nodes to a routing information table.

7. The sensor node of claim 6, wherein when an acknowledgement is not received for a message, the sensor node re-sends the message up to a predetermined number of times until:
the message is acknowledged; or
the predetermined number of times is reached and a last re-sending of the message is not acknowledged, after which the sensor node marks a respective network link as failed and removes the network link from the routing information table.

8. The sensor node of claim 7, wherein the re-sending is repeated until all nodes are discovered.

9. The sensor node of claim 7, wherein when the radio link is marked as failed, the sensor node broadcasts a route failure message to a remainder of the mesh network such that the other nodes that receive the route failure message can remove the failed link from their routing information tables.

10. The sensor node of claim 1, wherein the processor is further configured to perform compression, corrections, and information assurance functions.

11. The sensor node of claim 1, wherein the processor is further configured to perform pre-processing and quality control.

12. A node configured to perform scientific computing in a self-forming mesh network, comprising:
a line-of-sight (LOS) radio configured to transmit and receive communication signals;
a sensor configured to collect scientific data; and
a processor configured to:
perform scientific computing for pre-processing, quality control, statistical analysis, event classification, data compression and corrections, autonomous decisions and actions, triggering other nodes, and information assurance functions to provide data confidentiality, data integrity, authentication, and non-repudiation, and
maintain a low power sleep mode in a microwatt range until a predetermined amount of time has elapsed since a last transmission.

13. The node of claim 12, wherein the node is configured to form the self-forming mesh network with a plurality of other nodes by:
periodically sending messages comprising identifying information to, and receiving messages comprising identifying information from, the other nodes in the network that are within range of the LOS radio;
parsing a received message and determining nearby nodes in range of the LOS radio that can be used to relay messages to a final destination;
requesting routing information from neighbor nodes to discover more distant nodes; and adding the discovered more distant nodes to a routing information table.

14. The node of claim 13, wherein the messages comprise a source node address, a destination node address, an explicit route, and a hop index that identifies a next hop that the message takes in transit.

15. The node of claim 13, wherein when an acknowledgement is not received for a message, the node re-sends the message up to a predetermined number of times until:
the message is acknowledged; or
the predetermined number of times is reached and a last re-sending of the message is not acknowledged, after which the node marks a respective network link as failed and removes the network link from the routing information table.

16. The node of claim 15, wherein when the radio link is marked as failed, the node broadcasts a route failure message to a remainder of the mesh network such that the other nodes that receive the route failure message can remove the failed link from their routing information tables.

17. A node configured to perform scientific computing in a self-forming mesh network, comprising:
a line-of-sight (LOS) radio configured to transmit and receive communication signals;
a sensor configured to collect scientific data; and
a processor configured to:
perform scientific computing for pre-processing, quality control, statistical analysis, event classification, data compression and corrections, autonomous decisions and actions, triggering other nodes, and information assurance functions to provide data confidentiality, data integrity, authentication, and non-repudiation,
maintain a low power sleep mode in a microwatt range until a predetermined amount of time has elapsed since a last transmission, and
after the predetermined amount of time has elapsed:
retrieve the collected scientific data from the sensor,
process the retrieved scientific data,
store the processed scientific data in memory or send a message, and
return to the low power sleep mode.

18. The node of claim 17, wherein the node is configured to form the self-forming mesh network with a plurality of other nodes by:
periodically sending messages comprising identifying information to, and receiving messages comprising identifying information from, the other nodes in the network that are within range of the LOS radio;
parsing a received message and determining nearby nodes in range of the LOS radio that can be used to relay messages to a final destination;
requesting routing information from neighbor nodes to discover more distant nodes; and
adding the discovered more distant nodes to a routing information table, wherein
when an acknowledgement is not received for a message, the node re-sends the message up to a predetermined number of times until the message is acknowledged, or the predetermined number of times is reached and a last re-sending of the message is not acknowledged, after which the node marks a respective network link as failed and removes the network link from the routing information table.

19. The node of claim 18, wherein the messages comprise a source node address, a destination node address, an explicit route, and a hop index that identifies a next hop that the message takes in transit.

20. The node of claim 18, wherein when the radio link is marked as failed, the node broadcasts a route failure message to a remainder of the mesh network such that the other nodes that receive the route failure message can remove the failed link from their routing information tables.

* * * * *